(12) United States Patent
Erb et al.

(10) Patent No.: US 7,603,295 B2
(45) Date of Patent: *Oct. 13, 2009

(54) METHOD FOR ACQUIRING RIGHTS TO LEASE A DRILLING RIG

(75) Inventors: Kim Robert Erb, Houston, TX (US); Robert Richard Steven, Harleston (GB)

(73) Assignee: ODS-Petrodata, Inc., Houston, TX (US)

( * ) Notice: Subject to any disclaimer, the term of this patent is extended or adjusted under 35 U.S.C. 154(b) by 828 days.

This patent is subject to a terminal disclaimer.

(21) Appl. No.: 11/257,834

(22) Filed: Oct. 25, 2005

(65) Prior Publication Data

US 2007/0094146 A1    Apr. 26, 2007

(51) Int. Cl.
*G06F 17/30* (2006.01)
*G06Q 10/00* (2006.01)

(52) U.S. Cl. .................... 705/27; 705/1; 705/29; 707/10; 707/104.1; 709/219

(58) Field of Classification Search ............. 705/26–29, 705/1; 707/10, 100, 104.1; 709/217, 219, 709/223, 226; 718/101, 106; 719/316
See application file for complete search history.

(56) References Cited

U.S. PATENT DOCUMENTS

| | | | |
|---|---|---|---|
| 6,612,382 B2 * | 9/2003 | King | 175/40 |
| 6,879,962 B1 * | 4/2005 | Smith et al. | 705/22 |
| 7,096,223 B2 * | 8/2006 | Cope | 707/100 |
| 7,231,590 B2 * | 6/2007 | Abbar et al. | 715/255 |
| 7,257,594 B2 * | 8/2007 | Tamboli et al. | 707/101 |
| 7,286,959 B2 * | 10/2007 | Steinke | 702/182 |
| 7,293,029 B2 * | 11/2007 | Cope | 707/100 |
| 7,430,529 B2 * | 9/2008 | Erb et al. | 705/27 |
| 7,448,046 B2 * | 11/2008 | Navani et al. | 719/316 |
| 7,536,394 B1 * | 5/2009 | Gryparis | 707/100 |
| 2005/0177789 A1 | 8/2005 | Abbar et al. | 715/528 |

* cited by examiner

*Primary Examiner*—Andrew Joseph Rudy
(74) *Attorney, Agent, or Firm*—Buskop Law Group, PC; Wendy Buskop

(57) ABSTRACT

A method for acquiring rights to lease a drilling rig using client devices with secure information and qualifications bulletin boards is disclosed. The method authenticates a leassee of a drilling rig using a leassee client device to communicate with leassors using a secure server system. The leassee creates a bid proposal using a secure database server system and invites leassors to reply to the bid proposal and form tender offers. Then, the leassee replies to tender offers and awards a lease contract based on the best leasing conditions.

17 Claims, 7 Drawing Sheets

METHOD FOR ACQUIRING RIGHTS TO LEASE A DRILLING RIG

FIELD

The present embodiments relate to a method for acquiring rights to lease a drilling rig.

BACKGROUND

Traditionally, leases of drilling rigs, involve a leassor and a creating of a lease agreement. In creating the lease relationship and lease agreement, the prospective leassee can require information regarding the drilling rig from the leassor. At times, leassors might lack the time or expertise to fully monitor the condition of their drilling rigs with precision and regularity. This lack of time and expertise can lead to an inability for them to thoroughly inform the leassees of information that they require.

Some leassors turn to management companies. However, these companies can be expensive, and there are no assurances that the rent will be paid to the leassor when it is due. These property management companies can also lack the resources and expertise to provide the requisite information that a leassee requires before leasing a drilling rig.

Accordingly, a need exists for a computerized or Internet networked method for acquiring rights to lease drilling rigs. A need exists to provide a method for a group of leassees to obtain information regarding a plurality of drilling rigs.

A need exists to provide a method for a plurality of leassors to obtain information from leassees regarding the drilling rigs that they wish to lease. A need exists for a method to interface the needs of the leassee and the leassor in a manageable fashion.

The present embodiments of the invention meet these needs.

BRIEF DESCRIPTION OF THE DRAWINGS

The detailed description will be better understood in conjunction with the accompanying drawing as follows.

Figure 1:
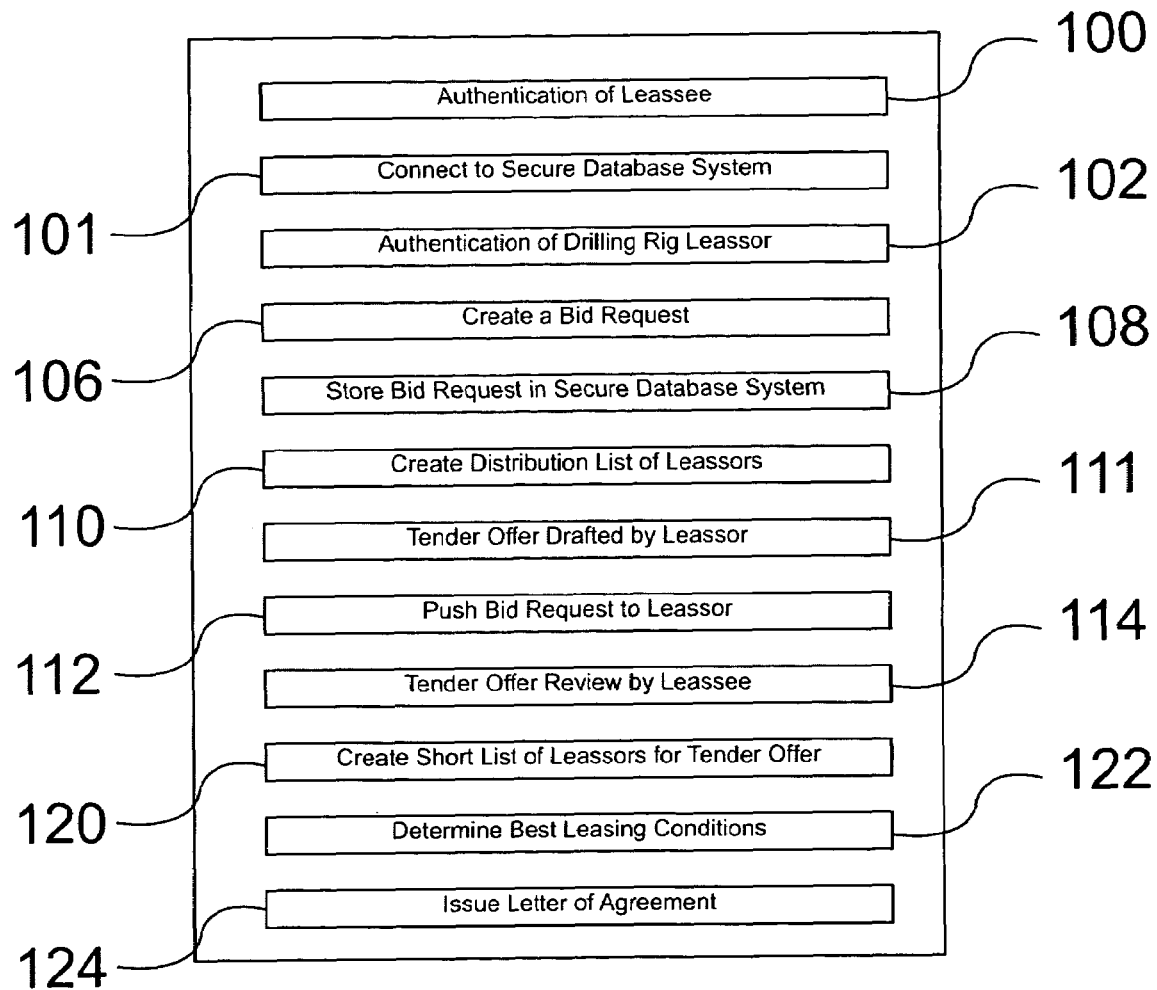
FIG. 1 is a flow diagram of an embodiment of a method for acquiring rights to lease a drilling rig for a defined period of time.

The present embodiments are detailed below with reference to the listed Figure.

DETAILED DESCRIPTION OF THE EMBODIMENTS

Before explaining the embodiments in detail, it is to be understood that the invention is not limited to the particular embodiments and that the invention can be practiced or carried out in various ways.

The present embodiments provide methods for acquiring rights to lease a drilling rig that can include for a specified period of time, such as a year, two years, 36 months, or some other time period, or can include for a particular activity. The present embodiments can be used with a group of leases for drilling rigs.

The present methods are performed on a network using a secure database server system in communication with the network. For example, a MicroSoft SQL server can be used as the secure server and the network can be: an Internet, a wide area network (WAN), a local area network (LAN), an Intranet, or a subscriber network. The system contemplates that the network can be a standard network or a fiber-optic network.

The method involves authenticating a leassee who is interested in leasing a drilling rig. The interested leassee can be authenticated using a client device and inputting a password and a personal identification code, for example: a number; a biometric scan, such as a retinal scan or a fingerprint scan; other similar unique codes, or combinations of these codes. For example, a user can transmit an encrypted password to a secure server. Then, the secure server can authenticate the user's identification and level of permitted access. Subsequently, the secure server can permit access of the authenticated user, which can be a potential leassee, an existing leassee, a leassor, or a potential leassor.

The leassees use a client device that connects to a secure database server system. The leassor client devices and leassee client devices can be computers, personal digital assistants (PDA), cellular phones with display and processing capability, laptops, Blackberrys™, interactive television devices, and similar interactive devices with display, two way transmissions, connectivity to the network, and processing capability. A satellite phone or similar communication tool adapted to communicate with the World Wide Web can be used. The database server system can be in communication with these leassor client devices and leassee client devices via the World Wide Web, or the server system can interact with these devices though a wide area network (WAN), a local area network (LAN), or a subscriber network, as well.

The client device preferably has a display, but it can be a TTY device for a blind person. The client device must have connectivity to a network, such as the Internet which is in communication with the secure database server system. The client device can connect by wireless connections, such as Bluetooth™, or by a wired connection.

The secure database server system includes a processor with associated memory, a database storage in communication with the processor, and I/O ports in communication with the processor for communication with a network. The processor can be a commercially available Compaq or Hewlett Packard server or an equivalent. The database storage can be centralized or a distributed database storage system, which uses multiple storage devices having available, for example, 40 gigabytes of memory.

The secure database server system authenticates the leassee at the start of the process, as the leassee desires to submit bid proposals to leassors. Leassors can be authenticated as users of the system in the same manner as leassees in the beginning of the process, or leassors can be authenticated only when they desire to submit a tender offer through the secure server. A leassor of a drilling rig can be in communication with the secure database server system using a leassor client device, that can be a Blackberry™, PDA, laptop computer, or similar device, which can be the same as the client device of the leassee.

The secure database server can receive the password and identification or a password and biometric of the leassor to permit connection to the secure database server system. An example of a biometric is a fingerprint, which is read by a fingerprint reader on the leassor client device and transmitted to the secure database, that compares at least six points of the fingerprint against stored fingerprints in the database, which are linked to accounts that pay for the secure server service. If there is a match, the leassor is authenticated.

Using the client device, the authenticated leassee creates a bid request for one or more drilling rigs of interest, which are identified as candidate drilling rigs in the database server. The bid documents generally include technical requirements for drilling rig operations. These bid documents are then stored in the secure database server system.

The authenticated leassee creates a distribution list of leassors. The leassors have drilling rigs for lease that match the technical requirements and other operational parameters that the leassees have listed in the formed tender documents. These leassors are either authenticated leassors or non-authenticated leassors.

A notice of the existence of bid requests for review is transmitted to the leassors client device. This notice is an "invitation to bid".

Upon review of the invitation to bid for the one or more drilling rigs, leassors of the list create tender documents for offering of one of the rigs for lease. The tender documents can be created apart from the secure server, and then transmitted to the secure server for further retransmission to the leassee. Tender documents can include, for example: technical requirements; commercial rates; insurance requirements; contract exceptions; and Quality, Health, Safety, and Environment (QHSE) exceptions. To access the secure server, the leassor must be authenticated by the secure server. Once authenticated, these tender documents can be stored in the secure server device as well.

The authenticated leassor can then transmit a copy of the tender documents to the authenticated leassee as a reply to the notification. An authenticated leassor can provide additional replies and information about the tender document to the leassee. Similarly, the leassee can request additional information and make queries. For example, the additional replies and questions can include queries concerning delivery as well as queries concerning other equipment on the rig.

The authenticated leassee reviews the responses from all the authenticated leassors and develops a short list of authenticated leassors relative to the bid responses. The leassee initiates negotiations with the short list of authenticated leassors. The negotiations can include discussion and negotiations of the best leasing conditions offered by the authenticated leassors from the short list. The best leasing conditions can include the best time the lease starts, the best renewal option, the best price for additional equipment to be put on the rig, the best terms regarding continuation of a drilling contractor's maintenance of a rig, and other factors.

A letter of agreement to the leassor offering the best leasing conditions for the lease of a drilling rig is created and the contract is awarded. Additional information can be added to bid documents or tender documents by appending or attaching a link, such as www.odspetrodata.com/blackdrillers.

In an embodiment, bid proposals can be divided up and distributed to various segments of a leassor business for review and comment by individual segments of the leassor's business. For example, a bid request can have maintenance and safety terms that go to the safety group. A bid request can have contract terms to go to the legal group. A bid request can have relocation information to go to the transportation section of the company. In this manner, the methods contemplate that the bid proposal can be parsed on the leassor client and, then, retransmitted to other client devices within the control of the leassor client for evaluation of the bid proposal.

The methods contemplate that a network accessible, secure qualification bulletin board can be formed and maintained in communication with the secure server system. The secure qualifications bulletin board can be on the server of the secure server system, or it can be on another server that is in communication with the secure server. The secure qualifications bulletin board can provide authentication and verification for users of the bulletin board. The bulletin board can be a "public" bulletin board to enable leassors with respective leassor client devices to provide information to a leassee and receive information from a leassee. For example, information that can be provided through the secure qualifications bulletin board includes leassee bid document alternatives, leassee bid document exceptions, or combinations thereof.

The database system can include a reporting and data storage module for providing reports and storing of qualification information. The reporting and data storage module can contain computer instructions to provide reports on various elements of data stored in data storage of the database server system. For example, the reporting and storage module can store information, such as initial bid proposals, clarifications requested for the bid process by a leassor or leassee, negotiation information developed during the bidding process, final bid proposals, tender offers, summaries of a leassee's selection process for a drilling rig, and combinations thereof.

The report from the data storage module can include, for example: commercial summaries outlined by issues or by rig comparisons, technical summaries outlined by specifications or by rig comparisons, evaluation histories, tender details, submission status, proposal status, and information captured by the bulletin boards. For example, a network accessible secure qualification bulletin board can allow leassors and leassees to request additional information on the bid and can provide information for private negotiation and agreement of contract qualifications. This information can include: a list of operators with drilling rig operations with corresponding existing and previous contract descriptions, type of rig equipment by operator, location of drilling rig operations or sites by operator and contract, and other tender information.

The method contemplates forming a network accessible secure information bulletin board that enables leassors and leassees to clarify the bid proposal, request additional information on the bid proposal, or combinations thereof. The network accessible secure information bulletin board can include information for public or private clarification of tender-related issues, such as: clarification of the operator for a type of drilling rig operation, clarification on contract description for an operator of a drilling rig operation, clarification on rig type equipment and water depth, clarification on location of drilling rig operation for a particular operator, and additional tender information. The secure qualification bulletin board provides one-to-one communication while the secure information bulletin board provides one-to-one or one-to-many communication. The details of the secure qualifications bulletin board and the secure information bulletin board are provided in FIGS. 5 and 6, respectively The method contemplates that a leassee can select operating rates to be addressed by the leassor for drilling rig operations. For example, selected operating rates can include: day rates, mobilization lump sum rates, demobilization lump sum rates, deficient/additional equipment lump sum rates, lump sum day rates, standby rates, force majeure rates, waiting on weather rates, repair rates, and similar rates.

An embodiment of the method contemplates that a leassee can select insurance requirements required by the leassor for drilling rig operations, such as requirements for daily tracking to be used for well analyses. The present embodiment contemplates that a leassee can select contract terms and conditions of a drilling contract.

Other items that can be selected by the leassees include safety requirements for drilling rig operations, a schedule of responsibilities between leassor and leassee for drilling rig operations, and a list of deficient equipment as part of the drilling rig tender.

The present method contemplates using an expiration deadline with the tender offer in an alternative embodiment.

The method can operate on a database server system which includes a processor, with associated memory, a database storage in communication with the processor, and I/O ports in communication with the processor for communication with a network. The database storage maintains information on drilling rigs; including general information on drilling rig capabilities, types of moorings, water depth the drilling rig can be placed in if a movable rig, or the water depth if a fixed rig, and rig owner information. The rig owner information can include: rig owner address, contact people, maintenance history, and other owner information. The database storage includes information on equipment used on the drilling rigs that is identified, which can include: blow out preventors (BOP); tubing hangers; draw works details; numbers and types of mud pumps; horsepower of mud pumps; cranes on the rigs; accumulators used on the rig; dynamic positioning systems; and other acoustic beacons or other locating devices for detecting sub sea wells. Other equipment can include: pipe handling equipment, pipe make-up equipment, ceiling height equipment, topdrive systems, pipe rack capacity, and other similar equipment on a drilling rig. The database storage system includes information on leassors with drilling rigs, which information includes: individual contact information, leassor company name, contacts within the company, regional information, contact address, phone numbers, fax numbers, and email addresses. The database storage system includes information on bid requests such as line item pricing; dates of execution of a bid; maintenance costs per day, by project, or by type of equipment; and other bid matters relative to daily costs. The database storage can include information on tender offers for drilling rig leases and information on the awards that were made based on the tender offers, as well. Tender offer information can include: the offered rig's technical specifications, deficient equipment, and tender qualifications, which include contract exceptions and commercials rates.

Operationally, the database server system can include computer instructions on computer readable media enabling potential leassees to perform the method.

The method contemplates that a leassee can create a bid proposal which requests a tender offer on a turnkey basis.

The method can be used to create a bid proposal to address a rig owned or controlled by a group of leassors, or it can address a group of rigs controlled by one leassor controlled by a group of leassors.

The method contemplates that potential leassees can combine with other leassees to make joint bid proposals, and enables groups of leassors to make joint tender offers. Joint tender offers can be made by partners of a lease, partners of a field, or other consortia.

The method contemplates that an expiration period can be placed on bid proposals or on tender offers, such as a week or a month.

The method contemplates the step that a leassor or leassee can edit or modify the distribution list for the invitation to bid; technical specifications for a bid; the initial or final bid requests; if there are more than one bid request, any and all responses to bid requests; and the initial and final tender offers depending on negotiations and revisions.

The method can include using an artificial intelligence program, or a fill-in-the-blank award contract to assist the leassee in awarding a lease contract to an authenticated leassor. The awarded contract can be of a type that can be displayed on a client device of a leassee and, then, transmitted to the leassor and stored in the data storage of the database server system.

With references to the figures, FIG. 1 is a flow diagram of an embodiment of a method for acquiring rights to lease a drilling rig. The method can begin by authenticating a leassee of a drilling rig (Step 100) for access to the secure server. Next, the authenticated leassee is permitted to connect to the secure database server system (Step 101). A leassor of a drilling rig can be authenticated and permitted to connect to the secure database server system (Step 102), or the leassor can simply be listed with additional information in data storage of the secure server with authentication only occurring by a leassor when the leassor desires to reply to a bid request and produce tender documents.

The authenticated leassee can create a bid request for drilling rigs of interest using technical requirements for drilling rig operation (Step 106). The bid request is stored in data storage of the secure database server system (Step 108).

The leassee creates a distribution list of leassors with drilling rigs for leases related to the created bid proposal (Step 110). For example, the leassor distribution lists can include: a global marketing manager, a regional specific marketing manager, a country specific marketing manager, a rig specific marketing manager, a deep water marketing manager, a shallow water marketing manager, an international marketing manager, and a domestic marketing manager.

The leassors can receive an invitation to bid and can be either authenticated leassors of the data base server system, or simply leassors who are offered the invitation to bid via the Internet or other communication tool, such as a fax.

The authenticated leassee transmits a bid request to the leassors' client devices based on the distribution list to review the bid proposal.

Tender documents are then drafted by a leassor and the leassor is authenticated by the secure server (Step 111). The authenticated leassor transmits tender documents based on the reviewed bid proposal and communicates these tender documents to the leassee client device through the secure server (Step 112).

Tender offers can be tracked by a leassor, a leassee, or an administrator of the system. In an embodiment, the tender offers can be tracked by date of uploading and date of downloading.

The tender documents are reviewed by the authenticated leassees (Step 114).

A short list of authenticated leassors relative to the bid responses is created (Step 120).

The authenticated leassee initiates negotiations with the short list of authenticated leassors, and the best tender offer is determined by the leassee using the short list (Step 122).

The authenticated leassee awards a letter of agreement to the leassor offering the best leasing conditions for the lease of a drilling rig (Step 124). For example, the best leasing conditions can be determined by best commercial fit, best technical fit, and rig availability based on tender requirements.

Figure 2:
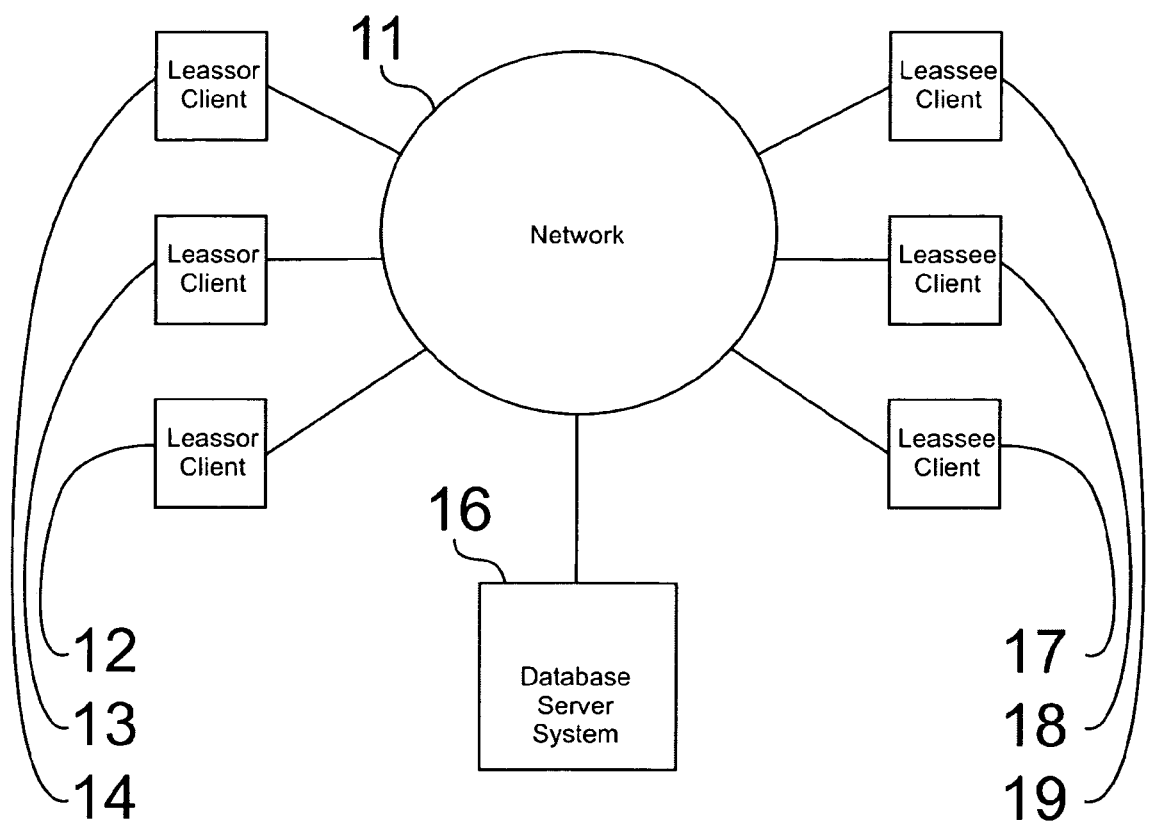
FIG. 2 is a diagram of a system upon which the method of the embodiments can operate.

FIG. 2 shows a network (11) on which this method can operate. The network is in communication with leassor client devices (12), (13) and (14), a database server system (16) and leassee client devices (17), (18), and (19). The network can be the Internet, and the client devices can be a combination of computers and PDA's such as a Palm Pilot™ or a Dell PC computer.

Figure 3:
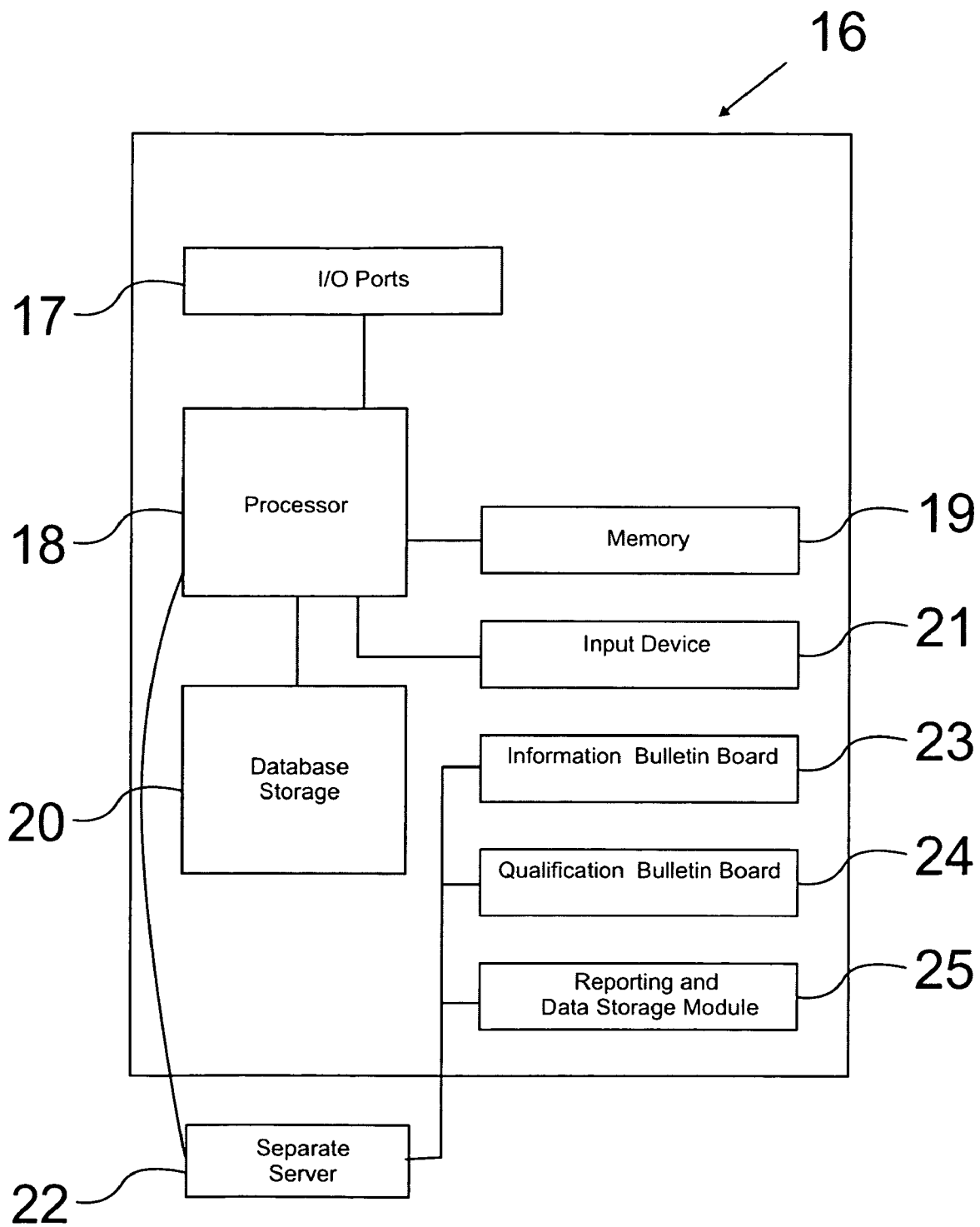
FIG. 3 is a diagram of the elements of a server system usable in a method for acquiring rights to lease a drilling rig.

FIG. 3 depicts an embodiment of the database server system (16) which has I/O ports (17) for connecting to the network (11). The database server system includes: a processor (18) with memory (19), a database storage (20), and an input device (21) for an administrator of the database server system. A separate server (22) can connect to the processor (18) for hosting an information bulletin board (23), a qualification bulletin board (24), and a reporting and data storage module (25). The database server system can include one database storage or multiple database storages.

Figure 4:
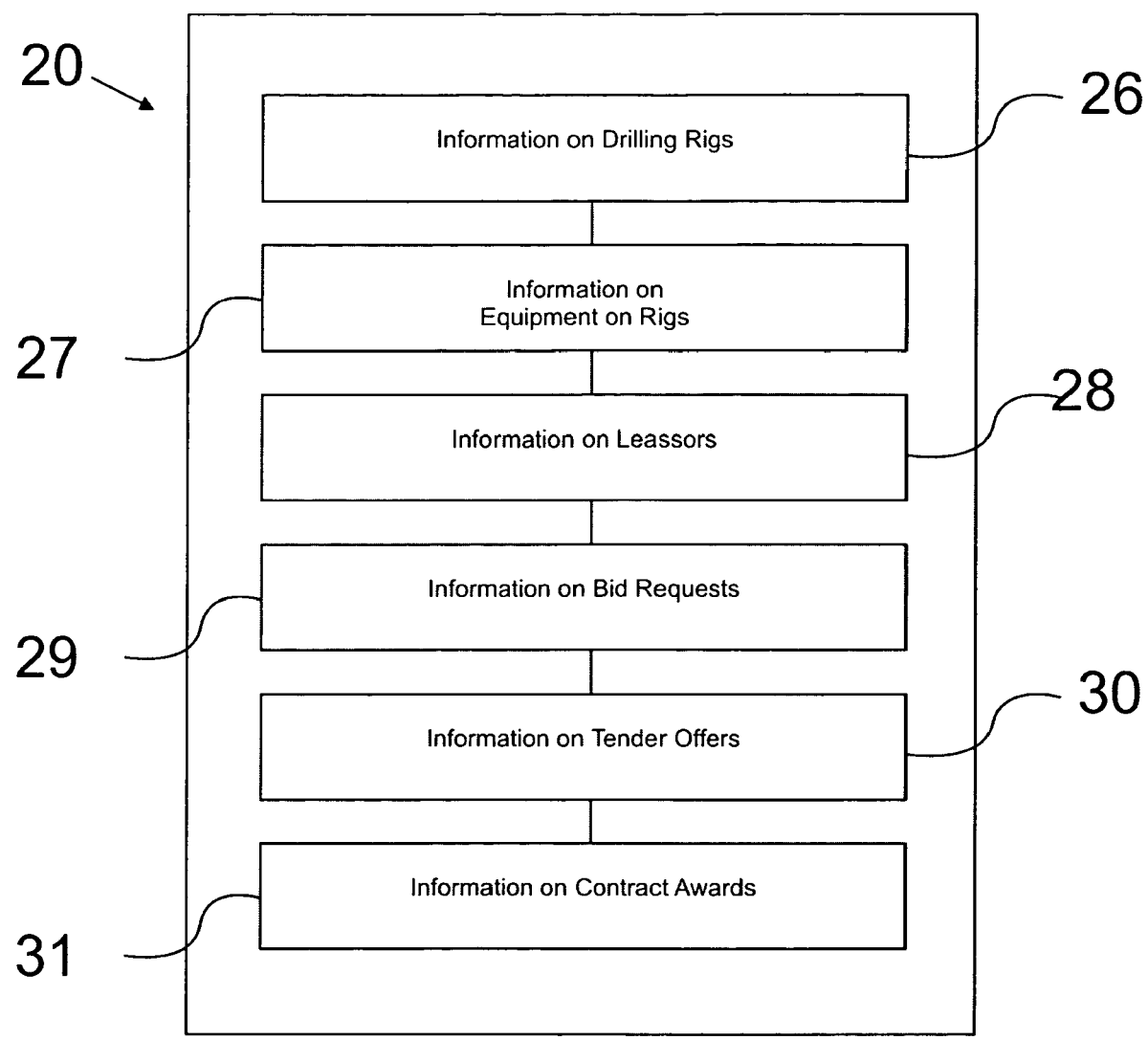
FIG. 4 depicts information which can be stored on a database server system according to the embodiments of a method for acquiring rights to lease a drilling rig.

FIG. 4 depicts the information on the database storage device (20) which includes information on drilling rigs (26), information on equipment on rigs (27), information on leassors (28), information on bid requests (29), information on tender offers for drilling rig leases (30), and information on contract awards based on tender offers (31). The system contemplates that the information can be displaced over one database storage device or multiple database storage devices.

Figure 5:
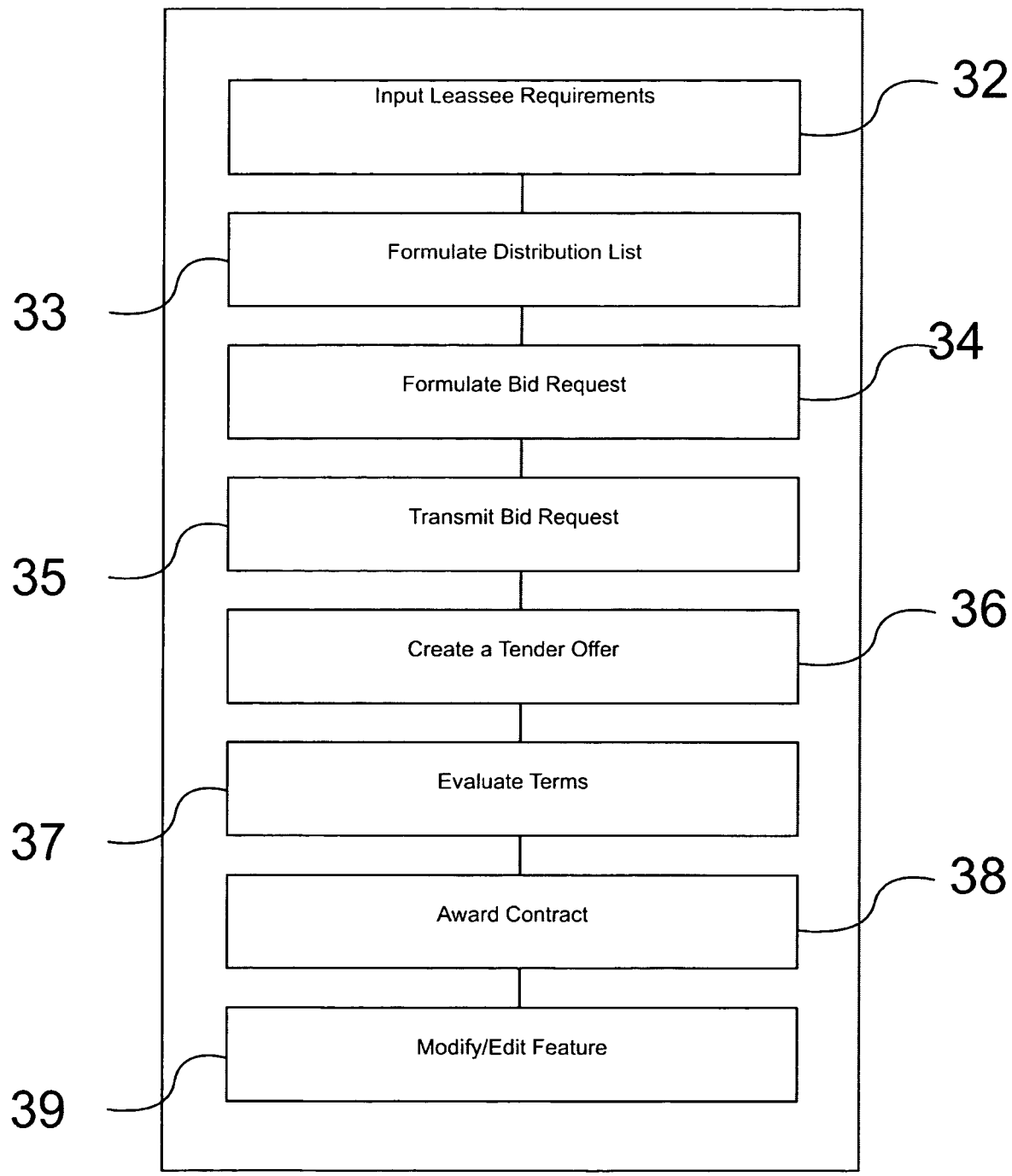
FIG. 5 depicts computer instructions usable in a method for acquiring rights to lease a drilling rig.

FIG. 5 depicts the computer instructions of the computer readable media usable to implement the method. These computer instructions are for the database server system and, initially, for enabling potential leassees to input leassee requirements for a desired drilling rig (32) which can be on a client device and the server system. Also included are computer instructions for formulating a leassor distribution list (33) by the potential leassee to receive an invitation to tender. Additional computer instructions assist in formulating a bid request (34). Further, computer instructions transmit a formulated bid request (35) to each leassor on the leassor distribution list namely, to their respective leassor client devices. This transmission can be, in essence, a transmission of the invitation to develop a tender offer.

Additional computer instructions enable leassors to use their respective leassor client devices to create tender offers regarding the lease of drilling rigs related to the bid request (36). Other computer instructions are for enabling leassees to determine the best leasing conditions offered by the leassors, enabling authenticated leassees to evaluate and determine which tender offers have the best terms (37), and enabling the authenticated leassee to award a contract to an authenticated leassor (38). Additional computer instructions permit having a feature of editing or modification (39) of the distribution list, technical specifications, bid requests, and tender offer and are within the scope of the elements of the server system for the method.

Figure 6:
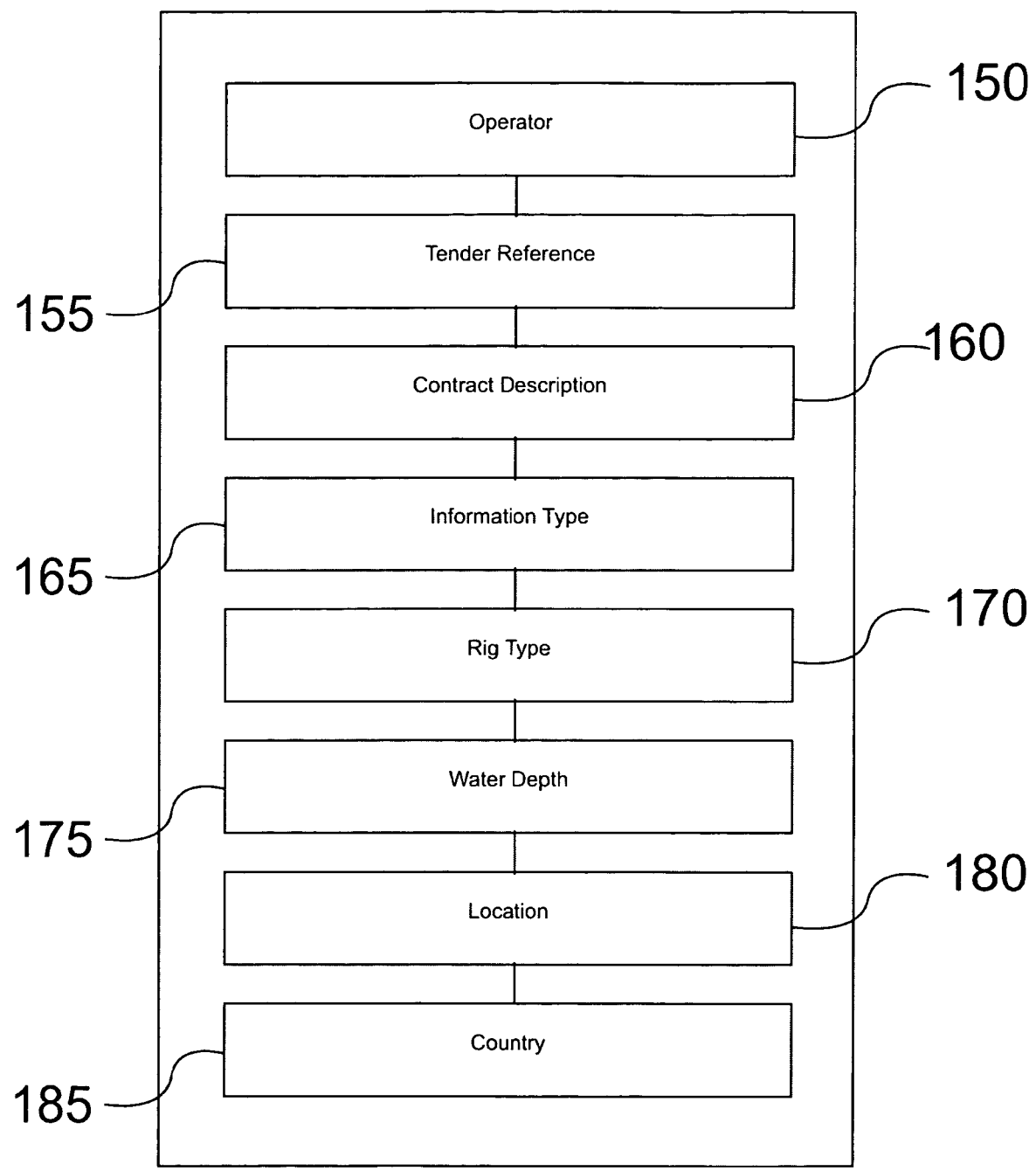
FIG. 6 depicts an embodiment of a secure qualifications bulletin board usable in a system for acquiring rights to lease a drilling rig.

FIG. 6 depicts an embodiment of a network accessible secure qualifications bulletin board usable in a method for acquiring rights to lease a drilling rig. The network accessible secure qualifications bulletin board can include information for private negotiation and agreement of contract qualifications. The information can begin with the name of the operator for drilling rig operations (150), including the company name or owner of the rig equipment and drilling rig operations. Next, a recording is made of: a tender information reference number (155) followed by a contract description, such as the length of the contract in years (160), and the type of information, such as tender (165). Further, the secure qualifications bulletin board information includes drilling rig type information, such as submersible rigs (170) and water depth for available rig equipment (175). The secure qualifications bulletin board information also includes the location for the drilling rig operations or site (180) and the country for drilling rig operations (185).

Figure 7:
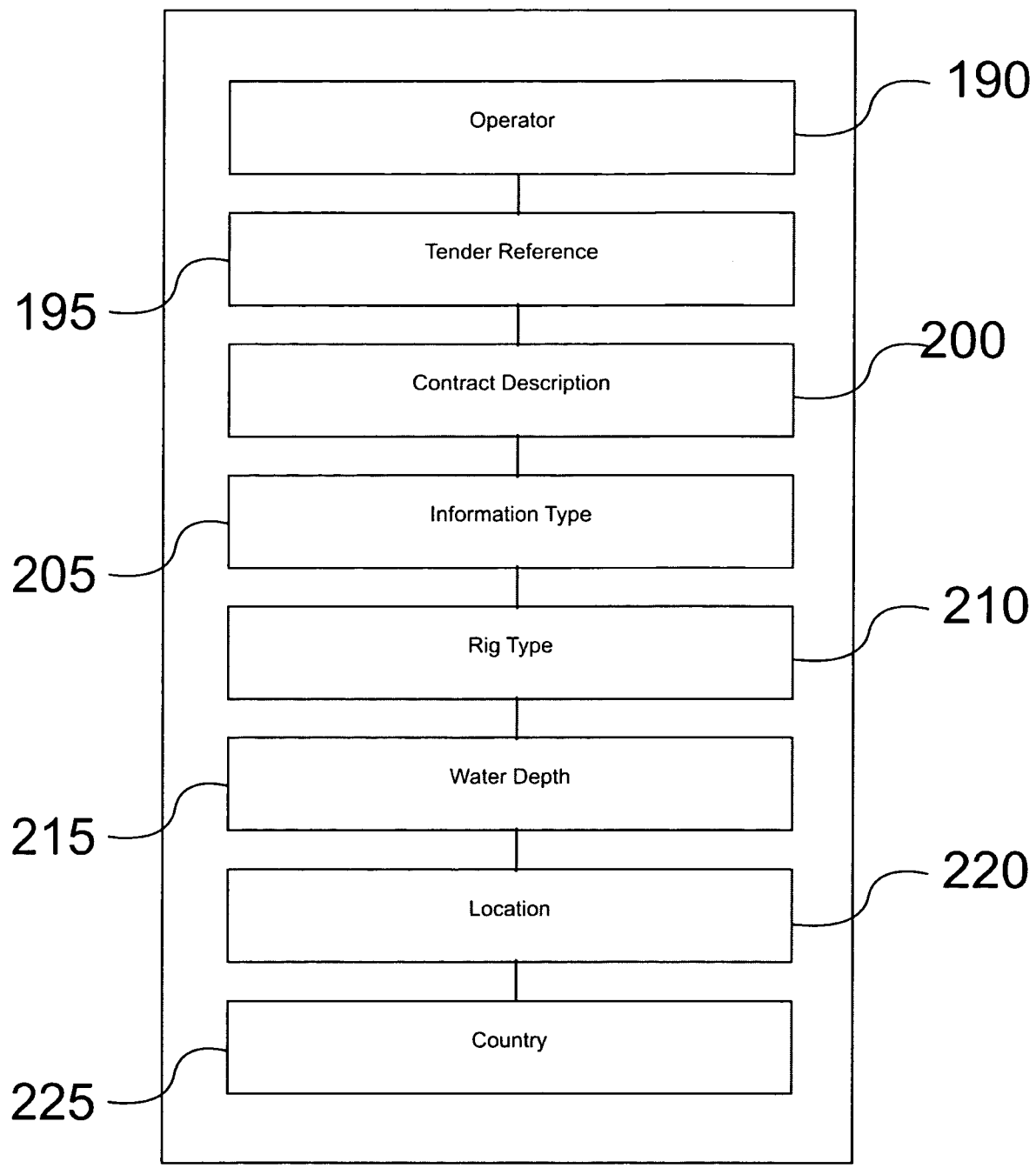
FIG. 7 depicts an embodiment of a secure information bulletin board usable in a system for acquiring rights to lease a drilling rig.

FIG. 7 depicts an embodiment of a secure information bulletin board usable in a method for acquiring rights to lease a drilling rig. The secure information bulletin board can include information for public or private clarification of tender-related issues. The secure information bulletin board information can include clarification of the name of the operator for a type of drilling rig operation (190), the recording and clarification regarding a tender reference number (195), clarification with regard to the contract description for an operator of a drilling rig operation (200), and clarification regarding the type of information offer, such as tender (205). Other information on the secure bulletin board for clarification can include: rig type equipment (210), water depth (215), location of drilling rig operations or site (220) and the country for a drilling rig operation (225).

While these embodiments have been described with emphasis on the embodiments, it can be understood that within the scope of the appended claims, the embodiments might be practiced other than as specifically described herein.

What is claimed is:

1. A method for acquiring rights to lease a drilling rig comprising:
   a. authenticating a leassee of the drilling rig and enabling an authenticated leassee to communicate with a secure server;
   b. placing information about leassors of the drilling rig on the secure server;
   c. creating a bid request for the drilling rig of interest using technical requirements for the drilling rig of interest supplied by the authenticated leassee or technical requirements supplied by the secure server;
      wherein the technical requirements comprise:
      i. the drilling rig type, location of the drilling rig, the drilling rig capabilities, types of moorings, whether or not the drilling rig is movable, water depth the drilling rig can be placed in, the drilling rig owner, information on equipment used on the drilling rig, and combinations thereof;
   d. storing the bid request, wherein the bid request is stored on a reporting and data storage module for providing reports and storing of data and information;
   e. creating a distribution list of leassors of the drilling rig by the authenticated leassee;
   f. communicating the bid request to leassors of the drilling rig,
      wherein the communication occurs over a network;
      wherein the network can be a an Internet, or a wide area network, or a local area network, or an Intranet, or a subscriber network;
   g. authenticating leassors of the drilling rig using the secure server to enable an authenticated leassors to draft a tender offer in reply to the bid request;
   h. transmitting the tender offer to leassees over the network and saving the tender offer to the secure server;
   i. creating a short list of authenticated leassors and leassors of the drilling rig based on the tender offer;

wherein the short list comprises:
  i. leassors selected by the leassee from those leassors that made tender offers;
  j. selecting the tender offer from the short list of authenticated leassors and leassors which most closely fills tender requirements of the leassee;
  wherein the tender requirements comprise:
    i. the technical requirements, the best commercial fit, rig availability, and combinations thereof; and
  k. accepting the tender offer.

2. The method of claim 1, further comprising the step of accepting the tender offer, wherein the accepting of the tender offer comprises issuing a letter of agreement to the authenticated leassor or leassor that has offered the tender offer which most closely fills the tender requirements of the leassee for the lease of the drilling rig by the authenticated leassee.

3. The method of claim 1, further comprising the step of initiating negotiations with the short list of authenticated leassors and leassors of the drilling rig by the authenticated leassee.

4. The method of claim 1, further comprising the step of adding additional information to the tender offer.

5. The method of claim 1, further comprising the step of parsing the bid request for distribution to segments of a leassor business for review and comment by segments of the leassor's business.

6. The method of claim 1, further comprising the step of forming a network accessible secure qualification bulletin board to enable leassors with their respective leassor client devices to provide information to a leassee and receive information from a leassee, wherein the information is selected from a member of the group consisting of:
  leassee bid document alternatives, leassee bid document exceptions, and combinations thereof 7. The method of claim 1, further comprising the step of editing the tender offer, the bid request, the distribution list, and combinations thereof.

8. The method of claim 1, wherein the reporting and data storage module stores information from a member selected from the group consisting of: bid proposals, clarifications requested for the bid process, negotiation information developed during the bid process, tender offers, summaries of a leassee's selection process for the drilling rig, and combinations thereof.

9. The method of claim 1, further comprising the step of forming a network accessible secure information bulletin board to enable leassors and leassees to clarify the bid proposal, request additional information on the bid proposal, or combinations thereof.

10. The method of claim 1, further comprising the step of enabling the leassee to select operating rates to be addressed by the leassor for drilling rig operations.

11. The method of claim 1, further comprising the step of enabling the leassee to select insurance requirements required by the leassor for drilling rig operations.

12. The method of claim 1, further comprising the step of enabling the leassee to select contract terms and conditions of a drilling contract.

13. The method of claim 1, further comprising the step of enabling the leassee to select safety requirements for a drilling rig operation.

14. The method of claim 1, further comprising the step of enabling the leassee to select a schedule of responsibilities between leassor and leassee for drilling rig operations.

15. The method of claim 1, further comprising the step of enabling the leassor to indicate a list of deficient equipment as part of the drilling rig tender.

16. The method of claim 1, wherein a group of leassors create the tender offer.

17. The method of claim 1, further comprising using an expiration deadline with the tender offer.

* * * * *